INVENTOR.
DELBERT J. GARDNER
BY
ATTORNEY

Nov. 12, 1968   D. J. GARDNER   3,411,133
MASTER CYLINDER WARNING DEVICE
Filed Oct. 13, 1965   2 Sheets-Sheet 2
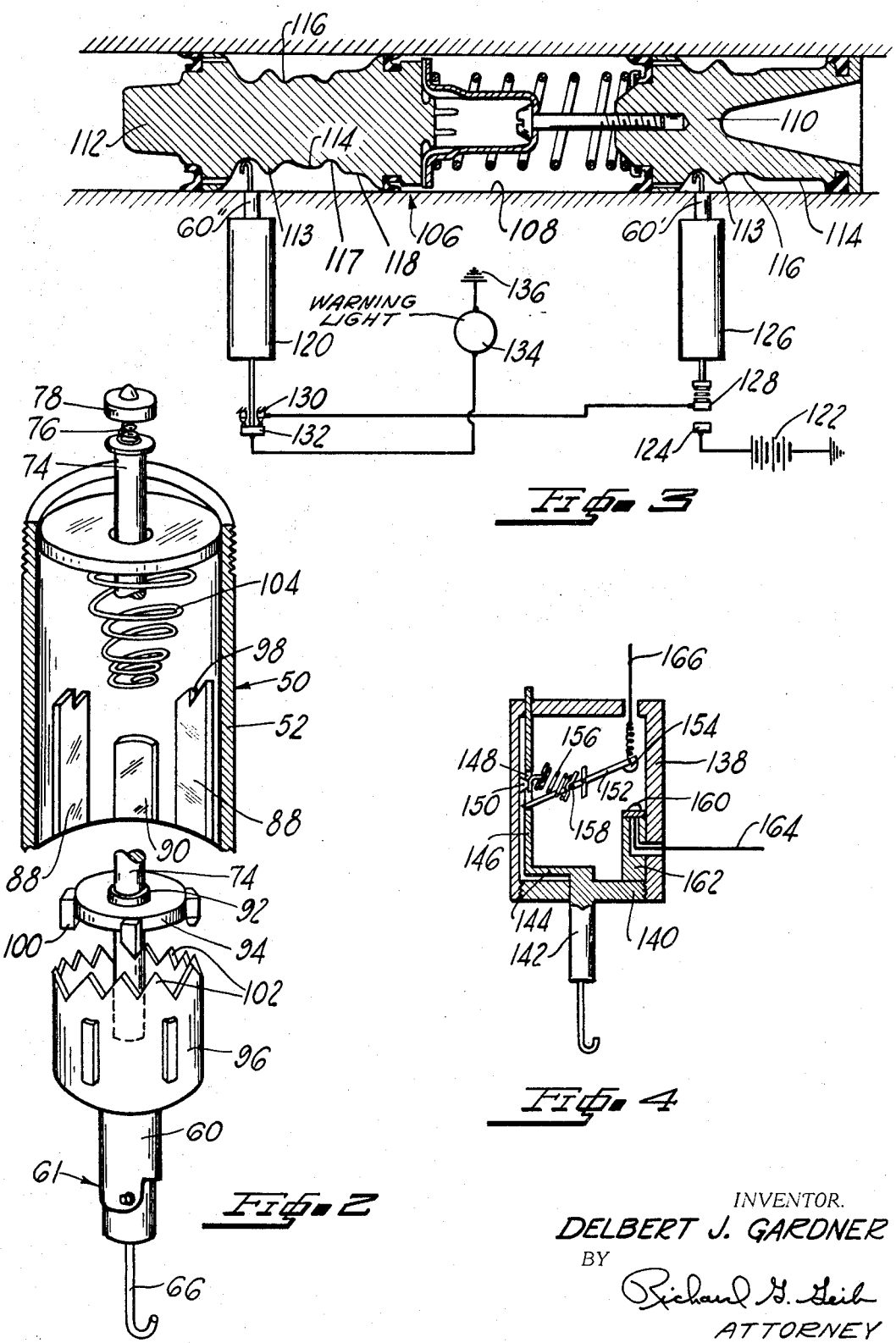
INVENTOR.
DELBERT J. GARDNER
BY
Richard G. Geib
ATTORNEY United States Patent Office 3,411,133
Patented Nov. 12, 1968

3,411,133
MASTER CYLINDER WARNING DEVICE
Delbert J. Gardner, South Bend, Ind., assignor to The Bendix Corporation, a corporation of Delaware
Filed Oct. 13, 1965, Ser. No. 495,482
10 Claims. (Cl. 340—60)

ABSTRACT OF THE DISCLOSURE

An indicating means for a hydraulic actuator having switch operator means operatively connected to a trailing body of a piston to provide information on abnormal travel thereof.

It is the principal purpose of this invention to provide a means to warn a vehicle driver of inadequate reserve displacement in a hydraulic brake system and to indicate failure in the hydraulic brake system. Furthermore, it is a principal object of this invention to provide a warning device that will indicate a need to adjust vehicle wheel brakes, to bleed the hydraulic system, or to repair a leak in the hydraulic brake system.

Another object of my invention is to provide a failure indication system that can be useful in a split type master cylinder braking system where failure in one section may not be readily detected by normal means, such as loss of pedal travel or increased braking effort.

It is a still further object of my invention to provide a device that may be applied to systems with conventional master cylinders, tandem master cylinders, and systems with combination of conventional master cylinders.

It is still another object of my invention to provide a warning device that may not only be employed in a master cylinder proper, but could also be located and operated by a master cylinder push rod, a master cylinder power unit push rod and/or brake pedal linkage.

More particularly, I have provided a warning device which will accomplish the following:

(1) A test of the warning or indicating member, such as a light or buzzer, each time the brake pedal is applied.

(2) Excitement of the warning or indicating member upon failure or inadequate hydraulic reserve, and maintenance of the excitement when brake pedal is released.

(3) Automatic discontinuation of the warning device or indicating member when the system is adjusted, repaired or bled.

More particular objects and advantages of my invention will appear from the following description of the drawings in which:

FIGURE 2 is an exploded isometric view of a switch means for use in such a system, which switch means embodies automatic reset features;

FIGURE 3 is a partial cross sectional view showing a master cylinder bore and pistons therein for operating an electrical system having a switch means in series connection with a warning device; and FIGURE 4 is a cross sectional view of a snap acting switch which may be utilized by my invention and which is provided with manual reset features.

Figure 1:
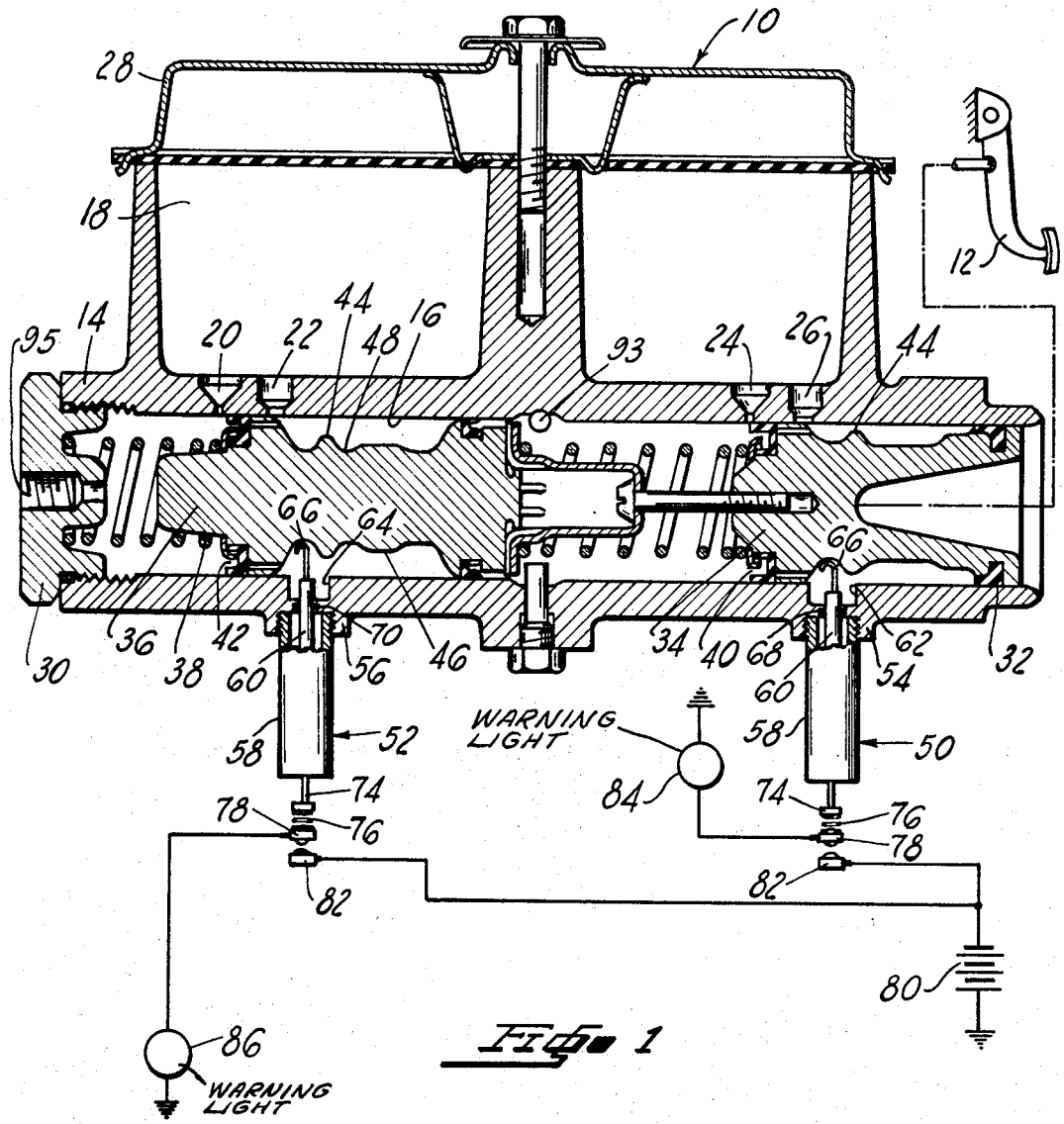
FIGURE 1 is a cross section of a master cylinder and a schematic electrical system showing a parallel circuit for a warning device in accordance with the principles of my invention.

With more particular reference to FIGURE 1 I have shown a master cylinder 10 arranged to be mechanically linked to a brake pedal 12 to be operated thereby. More particularly, the master cylinder 10 includes a housing 14 provided with a cylindrical bore 16 and a reservoir chamber 18 immediately thereabove. The reservoir chamber is communicated by means of radial ports 20, 22, 24 and 26 to the cylindrical bore 16. The reservoir chamber is closed by means of a removable cap structure 28, and the cylindrical bore is closed at one end by a removable plug 30 and at the other end by a seal 32 on a reciprocating piston 34.

While I have shown the utilization of my invention in a tandem master cylinder, this does not mean to limit it to such. In any event, in this use there is a forward piston 36 ahead of the piston 34 and connected thereto by means of a spring cage arrangement such as is familiar to those skilled in the art. Furthermore, a return spring 38 is placed between the plug 30 and the forward piston 36 to maintain the pistons 34 and 36 in the rearward position whenever the brake pedal 12 is released.

Adjacent the forward faces of the pistons 34 and 36 there are seal means 40 and 42, respectively, that cooperate with the radial ports 24 and 20, respectively, from the reservoir chamber 18 and with the cylinder bores 16 to provide fluid replenishment and pressurization within the bore 16 as may be also familiar to those skilled in the art to which my invention relates.

Each of the pistons 34 and 36 is provided with a peak contoured portion 44 immediately behind the faces thereof containing the seals 40 and 42 and a raised flat portion 46 of lesser diameter than the peak portions 44. Between the peak portions 44 and the raised flat portions 46, a recess 48 of lesser diameter than either of the peak or raised flat portions is machined for purposes as will be hereinafter explained.

In order to sense piston travel, a pair of similar switch means 50 and 52 are fitted into bosses 54 and 56 of the master cylinder. These switch means are generally shown in FIGURE 1 to include a switch housing 58 and a switch arm 60 which switch arm is reciprocally received within drilled openings 62 and 64 in the master cylinder. To each of the switch arms 60 are provided a cam portion 66 that extends inwardly into the cylinder bore 16 and is arranged to be operatively engaged by the peaked and raised flat portions of the pistons 34 and 36, and there are seals 68 and 70 within the respective drilled openings 62 and 64 about the cam portions 66 to maintain the integrity of the cylinder bore and prevent loss of reservoir fluid reserve.

Before passing on to FIGURE 2 and a more detailed description of the switches, I would like to describe the electrical system for the warning devices of FIGURE 1. Here there is employed a parallel circuit for two warning lights or buzzers 84 and 86. These warning devices may be installed in the passenger compartment of a vehicle in or behind the dash depending on whether lights or buzzers are preferred. They are individually actuated by a pair of contacts 78 and 82 brought together by a pair of rods 74 projecting from each switch 50 or 52 as the cam portions 66 are forced downwardly by the portions 44 and/or 46 of the pistons 34 and 36. In order to show the arrangement more clearly, the contacts are shown removed from the switch housings 58. However, in practice they would be internally arranged.

In order to accommodate the increased travel of the rods as cam portions 66 pass over the peaks 44, there is provided a spring connection 76 between the rod 74 and the contact 78. The warning devices are connected each to a ground and the contacts 82 are connected to the positive side of a power source 80, such as the battery for the associated vehicle.

If it is desired, one may interpose in the power circuit a further switch contact that would be engaged when the vehicle's engine is started to bypass the contacts 78 and 82 and energize the warning devices 84 and 86 momentarily to indicate the working condition of the electrical system. I have provided a similar indication by the use of the peaks 44 on the pistons which will flash or momentarily energize the warning devices each time the pistons start to move in the master cylinder bore.

With regard to hte details of one of my suggestions for a switch means, reference is now had to FIG. 2. The switch housing 58 is provided internally with a series of radially arranged locking guides 88 between which are placed a plurality of stops 90. The switch actuating rod 74 is formed to have a radial flange 92 inwardly of the switch housing that holds a rotatable plate 94 on reciprocating plunger 96 that is affixed to the switch arm 60. The locking guides 88 are formed with notches 98 on their uppermost face, as shown in FIGURE 2, and the plate 94 is formed with depending teeth 100 that are contoured to rest, normally, between upwardly projecting teeth 102 of plunger 96. The rod 74 abuts a surface of plunger 96 below the teeth and/or may be fitted within a locating recess to prevent sideloads thereon from hindering operation of the switch.

The angle of contour for the teeth 100 and 102 is such that upward movement of the plunger 96 against the force of a return spring 104 that bears on the flange 92 causes plate 94 to rotate. This rotation is such as to cause the teeth 100 to fall into notches 98 upon a limited upward travel of plunger 96 or pass over the notches to return to the upper face of stops 90 when cam portion 66 falls from the peaks 44 to the recess 48. The height of the raised flat portions is such as to cause the limited upward travel of the plunger to place the teeth 100 in the notches 98.

In order to prevent release of the switch locking means there is provided a one-way hinge connection 61 for the switch arm 60 so that the cam surfaces will be allowed to freely pass over the peak portions 44 on return of the pistons to the brake release position shown. This hinge connection permits the cam surfaces 66 to fall downwardly after the peaks 44 pass by surfaces 66 so that the switches may be restored automatically after repairs to the braking system and depression of the brake pedal.

Passing along now to FIGURE 3 there is shown a partial cross section of a master cylinder housing 106 having a bore 108 in which a pair of pistons 110 and 112 are reciprocally arranged, as in the master cylinder of FIGURE 1. There is one striking difference in the manufacture of these pistons which is noteworthy. The secondary piston 112 is not only provided with a peak portion 113 and a raised portion 114 separated by a recess 116, as is primary piston 110, but is also machined to have another portion 118 of the same radial height as peak portion 112 adjacent the rear of the piston. This would operate to release the locking of a secondary warning switch 120 when piston 112 has been moved to the maximum extent of its travel for purposes to be described further below.

The electrical circuitry for this arrangement of FIGURE 3 is of a series type, i.e., the power source or vehicle battery 122 is connected to normally a contact 124 of a switch 126. Another contact 128 arranged to be normally disengaged from 124 is connected to a normally closed set of contacts 130 and 132 of the switch 120 and thence to the warning device 134 to a ground 136 to complete the circuit. The switches 120 and 126 are similar to the detailed switch of FIGURE 2.

When used in a master cylinder of the type shown the protuberances formed on the respective pistons would be machined to take into account the difference in relative travel for each of the pistons. In other words, since it is to be expected that pistons 34 and 110 will have a travel greater than pistons 36 and 112, it would be necessary to stagger the peaked and raised portions so that a more consistent operation indication is available.

With regard to FIGURE 4, there is shown another type of switch which may be utilized in the warning system according to the invention. It should be noted such a switch is to be used with pistons having only one contour change. This type of switch would be of a snap-acting type with manual reset features. More particularly, this switch is constructed to have a cylindrical housing 138 closed by an end cap 140 that slidably supports a switch arm 142. The arm 142 has a radial leg 144 supporting a finger 146 that projects along the side of the housing and through an opening in the top. The finger is slotted, as at 148, to pass about a spring mount 150 bonded or formed with the side of the housing 138, and to bear on an end of a switch lever 152 opposite that mounting a switch contact 154. A spring 156 is angularly arranged between the mount 150 and a pin 158 affixed to lever 152 such that it is pivotable about the mount 150 under the urging of the finger 146. In its free state the spring will either maintain contact 154 in the position shown or in abutment with a contact 160 mounted on a pedestal 162 bonded to the housing 138 and forming an inward stop for the cap 140 in its threaded assembly to the housing. The contact 160 is connected by a wire 164 to the power source, and the contact 154 is connected by a wire 166, coiled to permit travel, to the warning device and thence to ground, for example, to complete the electrical circuit upon closure of the contacts.

As the finger 146 moves the lever slightly to either side of a position where the spring is in a horizontal position, as shown, spring forces will snap lever 152 to its maximum travel in either direction it is movable, If, for example, such movement would close the contacts, the lever 152 would be resting against the upper or opposite surface than shown of the slot 148. To reset, one needs only to press down on the finger 146 projecting from the housing 138 until the spring forces return the lever to the attitude shown in FIGURE 4.

My invention is equally applicable to the single type master cylinders or to a combination of this type of master cylinders having the pistons therein contoured as in FIGURE 1 and/or FIGURE 3. It should be appreciated with a single master cylinder only one switch is needed and with a combination of them either the parallel circuit or the series circuit may be utilized.

In operation and with reference to FIGURE 1, the brake pedal 12 is actuated by the operator of the vehicle to reciprocate the pistons 34 and 36 within the bore 16 of the master cylinder 10. Immediately the cam surfaces 66 will rise upon the peak portions 44 to close the contacts 78 and 82 with the springs 76 between the rod 74 and the contact 78 absorbing the difference in force and actuation of the contact between the peak portions 44 and the flat portions 46 of the pistons. This will provide the operator of the vehicle with an immediate indication of the working condition of his warning device or indicating means, as it may also be termed. Upon further effort being applied to the brake pedal 12 the pistons 34 and 36 will reciprocate such that the cam surfaces 66 fall off the peak portions 44 into the recesses 48 and the springs 104 force the switch arm 60″ to open contacts 130 and 132 to deenergize the 88 in the housing 58 and then as cams 66 fall into recess 48, springs 104 return the rod 74 until teeth 100 rest on stops 90. During this time, fluid pressure created within the cylinder bore is discharged ahead of each of the pistons by means of the respective ports 93 and 95.

Whenever the pressure discharged from these ports is not sufficient to actuate the brakes of the associated vehicle, the pistons 34 and 36 will continue reciprocation whereupon the cam surface 66 will start to rise upon the raised flat portions 46 of each of the pistons until the teeth 100 are aligned with the notches 98 whereupon the switch arms 60 lock and maintain contact of the points 78 and 82 to energize the respective indicating devices 84 or 86, as the case may be. As the pistons 34 and/or 36 return to the brake release position, the one-way hinge 61 permits passage of cams 66 over peaks 44 so that the failure indicator, if actuated, stays on. Release of the switches 50 and/or 52 after repairing the system is by merely depressing the brake pedal to cause peaks 44 to raise and rotate plates 94 so that teeth 100 may freely fall onto stops 90 formed on the interior sidewalls between locking guides 88 of the switch housings 58.

As for the operation of the system shown by FIGURE 3, once again depression of the brake pedal causes movement of piston 110 which has its peak protuberance 113 immediately raise the switch arm 60' of switch 126 to close contacts 124 and 128. Further depression of the pedal will engage peak 113 of piston 112 to cause switch arm 60" to open contacts 130 and 132 to deenergize the warning device. Thus, it may be appreciated that when the piston 112 is in the position shown, or when the cam of arm 60" is in the recess between the peak portions 113, 118 and the raised flat portion 114 and when peak 113 or the raised flat portion 114 of piston 110 has closed contacts 124 and 128, then and only then will indicator 134 be actuated.

A typical illustration we have surmised for this series system is to take a 50—50 split system, remembering the location of protuberances 113, 114 and 118 depending on the spilt ratio, and setting forth the following conditions:

(1) When both the primary piston 110 and the secondary piston 112 have traveled their full allotted distance, upon release, switch 126 will be locked on and as arm 60" extends into recess 117 after brake release, the warning is locked on. This could also occur, if instead of the added peak 118 on the piston 112, the recess 117 would be carried back to the rear end of piston 112, but here the warning would come on during application as soon as arm 60" sensed the recess 117 and arm 60' sensed the raised flat portion 114.

(2) The same pattern would be true when the piston 110 has only traveled half of its allotted distance and piston 112 has traveled its total distance.

(3) Likewise, when the primary piston has traveled half of its distance to again place arm 60' under the influence of raised flat 114 and the piston 112 has not traveled at all, the warning device will be locked on.

(4) Also when the primary piston has traveled half of its distance and piston 112 has traveled such that arm 60" extends into recess 117 after brake release, the arm 60" moves onto the flat raised portion 114 to provide a secondary blip of the indicator showing the need to check the brake system.

While I have shown my invention embodied in one form of master cylinder, I have done so only for the purpose of showing the possible construction to which my invention may be applied, and as stated above, my invention is equally applicable to the standard type master cylinder. Therefore, the scope of my invention is to be limited only by the appended claims.

I claim:
1. A master cylinder comprising:
  a housing having a reservoir chamber and a cylinder bore therethrough;
  a reciprocal piston operatively arranged in said cylindrical bore having means for terminating communication of said reservoir chamber and said cylindrical bore upon reciprocation of said piston, said piston having a trailing contoured body arranged to be connected to an operator-operated control member, said contoured body having a peak contoured portion immediately ahead of a raised flat portion;
  a switch means including a housing affixed to said master cylinder and a switch arm reciprocally arranged in said switch housing and projecting through a drilled opening in said master cylinder to extend within said cylindrical bore, said switch arm having a cam portion operatively connected to the contoured portion of said piston and an electrical contact means resiliently connected with said switch arm to be displaced as said cam portion thereof is reciprocated by the contoured portion of the piston;
  an electrical circuit having a contact point adjacent the contact point resiliently connected to said switch arm and normally spaced therefrom, said indicating means having devices operatively connected therewith that are actuated upon closure of said contact points such as would normally occur when said cam portion of said switch arm rises onto the peak portion of the contoured section of said piston for momentary actuation of said devices to provide an operator with the indication of their working condition, which devices are deactuated upon further reciprocation of said piston until said cam portion rises upon said raised flat portion of said piston whereupon said actuation of said device is locked to provide a continuous indication to the operator of the fact that the piston in said master cylinder has reciprocated beyond a predetermined safe point.

2. A master cylinder according to claim 1 and further characterized in having a tandem piston arrangement and dual switch means operatively arranged to provide independent indication of each said pistons combined and singularly beyond a safe reciprocating distance within said master cylinder.

3. A master cylinder according to claim 1 wherein said switch means further comprises cooperating locking means for said switch arm and said switch housing which locking means is arranged to be engaged only upon the contact of said cam portion of the switch arm with the raised flat portion of the piston means.

4. A master cylinder according to claim 1 wherein said switch means includes a one-way hinge connection arranged to actuate said contact points only as said piston is actuated and will not disturb said contact points as said piston is released or returned to its rest position.

5. An indicating system for an actuator comprising:
  a first working means in said actuator having a trailing contoured portion;
  a second working means operatively connected to said first working means in said actuator, said second working means having a trailing contoured portion;
  a first switch means including a switch arm operatively connected to said first working means to be actuated by said contoured portion thereof;
  a second switch means operatively connected to said second working means to be actuated by said contoured portion thereof; and
  an electrical means including indicating means operatively connected to said first switch means and said second switch means to be actuated thereby.

6. An indicating system according to claim 5 wherein said contoured portions of both said first and second working means includes a peak protuberance and a raised flap protuberance of lesser height than said peak protuberance.

7. An indicating system according to claim 6 wherein said electrical means includes a first indicating means operatively connected to said first switch means and a second indicating means operatively connected to said second switch means.

8. An indicating system according to claim 6 wherein said second working means is provided with another peak protuberance on an opposite side of the raised flat protuberance than the original peak protuberance.

9. An indicating system according to claim 8 wherein said electrical means includes a series connection between a power source said switch means and said indicating means.

10. An indicating system according to claim 5 wherein said peak and raised flat protuberances of said first and second working means are staggered in location along a body portion of said first working means in comparison with a body portion of said second working means.

References Cited

UNITED STATES PATENTS

| | | | |
|---|---|---|---|
| 2,535,940 | 12/1950 | Malvin | 200—82 |
| 2,046,316 | 7/1936 | Bentz | 340—242 |
| 2,734,960 | 2/1956 | Reynolds | 340—242 XR |
| 2,767,392 | 10/1956 | Szwargulski | 340—242 |
| 3,011,595 | 12/1961 | Heiss et al. | 340—52 XR |
| 3,329,933 | 7/1967 | Van Tuyl | 340—242 XR |

JOHN W. CALDWELL, *Primary Examiner.*

ALVIN H. WARING, *Assistant Examiner.*

PO-1050
(5/69)

UNITED STATES PATENT OFFICE
CERTIFICATE OF CORRECTION

Patent No. 3,411,148      Dated November 12, 1968

Inventor(s) H. D. FETTEROLF ET AL

It is certified that error appears in the above-identified patent and that said Letters Patent are hereby corrected as shown below:

In the Claims:

Column 6, line 9,    change "materail" to --material--;
line 11,    after "material" add --therebetween forming a capacitive coupling--;
line 11,    delete "said first and said second coatings of";
line 12,    delete "pling".

SIGNED AND SEALED
NOV 4 1969

(SEAL)
Attest:

Edward M. Fletcher, Jr.
Attesting Officer

WILLIAM E. SCHUYLER, JR.
Commissioner of Patents